United States Patent [19]
Noji

[11] Patent Number: 6,098,912
[45] Date of Patent: Aug. 8, 2000

[54] WINDING MACHINE HAVING FREELY POSITIONABLE NOZZLE

[75] Inventor: Kaoru Noji, Date-gun, Japan

[73] Assignee: Nittoku Engineering Co., Ltd., Saitama-Ken, Japan

[21] Appl. No.: 09/120,254

[22] Filed: Jul. 21, 1998

[51] Int. Cl.[7] ............................................... H02K 15/085
[52] U.S. Cl. ............................................................ 242/432.5
[58] Field of Search .................... 242/432.5, 432.3, 242/432.2, 437.2

[56] References Cited

U.S. PATENT DOCUMENTS

| | | | |
|---|---|---|---|
| 4,157,165 | 6/1979 | Bierman et al. | 242/437.2 |
| 4,817,888 | 4/1989 | Arnold | 242/437.2 |
| 4,836,461 | 6/1989 | Koizumi et al. | 242/437.2 |
| 4,966,337 | 10/1990 | Fahrbach | 242/437.2 |
| 5,810,278 | 9/1998 | Ruoss | 242/432.5 |
| 5,895,004 | 4/1999 | Burch | 242/432.3 |

FOREIGN PATENT DOCUMENTS

| | | |
|---|---|---|
| 1-308149 | of 0000 | Japan . |
| 2-254948 | of 0000 | Japan . |
| 4-101649 | of 0000 | Japan . |
| 58-37904 | of 0000 | Japan . |
| 6-233504 | of 0000 | Japan . |
| 6-245442 | of 0000 | Japan . |
| 6-54493 | of 0000 | Japan . |
| 63-81670 | of 0000 | Japan . |
| 96155 | 5/1985 | Japan . |
| 266050 | 11/1986 | Japan . |

*Primary Examiner*—Katherine A. Matecki
*Attorney, Agent, or Firm*—Pearne, Gordon, McCoy & Granger LLP

[57] ABSTRACT

A winding machine is provided, by which it is possible to cope with various kinds of shapes of the winding section, to realize stable winding, and to perform an operation of connecting the end of the wound wire to a terminal and a winding operation in a single process. The winding machine comprises a nozzle which is movable while letting out a wire; driving device for driving the nozzle; direction switching device for making the direction of the nozzle switchable; and winding position setting device for setting the position of a winding section onto which the wire is wound, and wherein the wire is wound onto the winding section according to movement of the nozzle, and the wire is fixed to a wire fixing section at the end of winding.

9 Claims, 3 Drawing Sheets

WINDING MACHINE HAVING FREELY POSITIONABLE NOZZLE

BACKGROUND OF THE INVENTION

1. Field of the Invention

The present invention relates to a winding machine particularly suitable for winding of an inner-rotor type stator or the like. This application is based on Patent application No. Hei 9-78454 filed in Japan, the contents of which are incorporated herein by reference.

2. Description of the Related Art

Examples of conventional winding machines, used for manufacturing a stator of a stepping motor or the like, are disclosed in the following publications:

Japanese patent application, first publication, No. Sho 60-96155 ("Winding machine"); and Japanese patent application, first publication, No. Sho 61-266050 ("Winding machine").

In the winding machine disclosed in the first example, Sho 60-96155, as shown in FIGS. 2 and 3 of the publication, cylindrical needle shaft 4 which is mounted on base 7 such that the needle shaft can be moved in a direction of the cylinder axis and can be rotated in its circumferential direction, and needle 3 is provided on the head of the needle shaft 4 in a direction perpendicular to the cylinder axis of the shaft 4. Wire 6 is inserted into the empty hole of cylindrical needle shaft 4, and passes through and is output from needle 3. The wire is wound onto winding section 2 on core 1 held by core holder 8 which has a function of index rotation. The winding operation is realized by a stroke in the axial direction and an oscillating (or reciprocating) motion in the circumferential direction of the needle shaft 4. In the winding machine, pin 17 is fixed to the above needle shaft 4 via holder 17 in a direction perpendicular to the axis of the shaft, and taper cone 18 is eccentrically provided in parallel to the axis of pin 17 also on base 7. The taper cone 18 is rotatable using a driving machine via rotational axis 19 and bearing 20. Taper bearing surface 23 is arranged on this taper cone 18, with an angle of ½ of the oscillation angle necessary for an oscillating motion of needle 3, with respect to the line of the rotational center of the taper cone. L-shaped bracket 24 is mounted on the taper bearing surface 23 and the above pin 17 is coupled via spherical slide bearing 27 to the bracket 24.

In the above-explained winding machine, when a motor (not shown) as a driving machine is rotated, L-shaped bracket 24 is rotated and needle shaft 4 coupled to the bracket 24 via the spherical slide bearing 27 and pin 17 makes a reciprocating motion. As a result, elliptical locus line A drawn by needle 3 is obtained and wire 6 output from needle 3 is wound around winding section 2 of core 1.

On the other hand, winding machine 10 of the second example, disclosed in Sho 61-266050, as shown in FIGS. 1–6 in the publication, comprises main rod 11 mounted to base C in freely sliding and rotating form; head 13, mounted to one end of the main rod 11, to which freely movable nozzle 12 for delivering and letting (lead) wire A off is mounted; driving shaft 14 mounted on the base C, along a direction perpendicular to the main rod 11; motion converting mechanism 15, disposed between the driving shaft 14 and main rod 11, for rotationally moving nozzle 12 around core W by reciprocatively moving main rod 11 along its length and also around its axis in accordance with rotation of driving shaft 14; and traverse mechanism 16 for adjusting a winding distance of wire A by adjusting the amount of projection of nozzle 12. General structural elements of traverse mechanism 16 are sub-rod 17 frictionally engaged into main rod 11; a group of toothed wheels 18, provided between one end of the sub-rod 17 and the nozzle 12, for moving nozzle 12 along a direction of its length in accordance with relative rotation of the sub and main rods 17 and 11; and cam 19, coupled to the other end of sub-rod 17, for relatively rotating the sub and main rods 17 and 11.

In the winding machine of the second example, when driving shaft 14 is rotated, main rod 11 is subjected to a linear reciprocating motion along the direction of its length and also to a rotational reciprocating motion around its axis within a predetermined angle of rotation. In this way, nozzle 12 of head 13 is rotationally moved around core Y.

One end of wire A is fixed to core Y; thus, according to the above operation, wire A is successively pulled from nozzle 12 and is simultaneously wound around the circumference of core Y.

Additionally, according to the relative rotational motion of the main and sub rods 11 and 17, nozzle 12 is moved in its length direction via the group of toothed wheels 18. Therefore, by shifting the position where wire A is pulled from nozzle 12 in the length direction of core Y, wire A is wound and aligned.

In the above-explained first example, the following problems have occurred.

(1) There is an advantage in that needle 3 can be subjected to both up/down (i.e., vertical) and rotational motions using a single drive motor. However, the locus of the motion of needle 3 is fixedly specified according to the rotational angle of taper cone 18 and L-shaped bracket 24; thus, it is impossible to perform winding suitable for any sizes such as outer diameter and winding thickness of winding section 2 of any different kind of core 1.

(2) The locus of the motion of needle 3 is elliptical, by which the wire cannot be closely wound to winding section 2 of core 1. Therefore, the locus at winding of the wire is not stable, which tends to cause disordered winding conditions. Such a condition produces a problem in which the wire is not effectively wound within a predetermined winding area.

(3) It is necessary to tie up and connect the end of wound wire A to a terminal. The tie-up operation is an additional process after winding, and there has been a demand in which the winding and tie-up operations can be performed in a single process.

(4) Needle 3 is not moved in Its axial direction; thus, a p art of winding section 2 of core 1 bulges like a conga drum. Accordingly, the wire is not efficiently and uniformly wound over the whole length of winding section 2.

On the other hand, the second example solves the above problem (4); however, the problems (1)–(3) are still not solved because it is difficult to extend a possible rage for winding.

SUMMARY OF THE INVENTION

In consideration of the above problems, the present invention has the following objectives.

(1) To perform winding suitable for each shape of various kinds of winding sections.
(2) To realize stable winding.
(3) To effectively perform winding over a predetermined winding range.
(4) To easily determine a winding position.
(5) To perform an operation of connecting the end of the wound wire to a terminal and a winding operation in a single process.
(6) To improve operability.
(7) To improve functional capability.

(8) To reduce the number of working processes.

(9) To improve the winding space factor.

To achieve the above objectives, the present invention provides a winding machine comprising: a nozzle which is movable while letting out a wire; driving means for driving the nozzle; direction switching means for making the direction of the nozzle switchable; and winding position setting means for setting the position of a winding section onto which the wire is wound, and wherein the wire is wound onto the winding section according to movement of the nozzle, and the wire is fixed to a wire fixing section at the end of winding.

In the present invention, the driving means can be constructed using three-directional driving sections which are combined with each other, for example, cross-direction, longitudinal-direction, and vertical-direction driving sections. An exemplary driving section comprises a guide arranged along the driving section; a rotational shaft provided in parallel with the guide, on a surface of the shaft a male screw is arranged; a moving section coupled with the rotational shaft via a ball screw; a connective section connected with the moving section; and a driving source for driving the rotational shaft.

It is possible to fix the cross-direction driving section on a base; to arrange the longitudinal-direction driving section to be movable in the cross direction with respect to the cross-direction driving section; to arrange the vertical-direction driving section to be movable in the longitudinal direction with respect to the longitudinal-direction driving section; and to arrange the nozzle to be movable in the vertical direction with respect to the vertical-direction driving section.

As the driving source, a servo motor or a stepping motor can be used.

The direction of the nozzle is switchable, for example, between a vertical direction and a direction perpendicular to the vertical direction, by the direction switching means.

The direction switching means may comprise a nozzle rotating section being rotatably arranged, to which the nozzle is fixed; and a direction setting section for setting the direction of the nozzle rotating section, and the direction setting section comprises a crank, connected to the nozzle rotating section, for rotationally driving the nozzle rotating section by moving in a direction along the length of the crank; and a crank driver for driving the crank.

The crank may comprise a joint and at least two parts coupled with the joint and driving directions of these two parts are different from each other, or the crank (itself) may be elastically deformable.

A hinge may be used as the joint.

As the crank, a solenoid or an air cylinder may be used.

A typical operational example follows: The nozzle is driven in the three driving axis at the same time by the driving means. At the winding, the nozzle is driven in a manner such that the nozzle is moved along (the circumference of) the cross-sectional shape of the winding section, and also is moved along the direction of the length of the winding section by the diameter of the wire for each round of the winding of the wire. At the end of winding, the position of the nozzle is switched to a direction substantially perpendicular to a direction at the winding by the direction switching means, and the nozzle is driven to wind and fix the wire to the wire fixing section.

The winding position setting means may be disposed on a base and set the position of each of plural wining sections in turn so that the nozzle can wind the wire onto the set winding section, and the winding sections are arranged on a circumference and spaced at a distance from each other, and the winding position setting means may have an index mechanism for rotationally moving the next winding section so as to set it to be ready for winding when winding for each winding section is completed.

In addition, the winding position setting means may subject the winding section to a reciprocating motion in synchronization with the motion of the driven nozzle.

Wire cutting means may be disposed at a position on a base, suitable for cutting the wire, and may comprise a cutter for cutting the wire; a moving section to which the cutter is provided; a motion rail for defining the (moving) position of the moving section; a driving source, provided inside the motion rail, for moving the cutter along the motion rail by driving the moving section; a cutting operator for making the cutter perform a cutting operation during and in cooperation with the driving operation along the motion rail by the driving source; and a supporter, fixed to the base, for supporting the above parts of the wire cutting means on the base.

A temporary tie-up pin may be disposed on a base, near the winding position setting means and the wire cutting means, onto which the wire is wound and fixed so as to cut the wire.

According to the winding machine of the present invention, the following effects can be obtained.

(1) The direction of the nozzle is switchable by the direction switching means; thus, an operation of connecting the end of the wound wire to a terminal and a winding operation can be performed in a single process.

(2) By performing the operation of connecting the end of the wound wire to a terminal and the winding operation in a single process, (the number of) working processes can be reduced.

(3) By reducing the working processes, operability can be improved.

(4) The nozzle can be driven using the driving means for realizing the three-direction simultaneous driving operation. Therefore, stable winding can be realized by moving the nozzle along the shape of the winding section.

(5) According to the movement of the nozzle along the shape of the winding section, winding can be effectively performed over a predetermined winding range. As a result, it is possible to improve the winding space factor.

(6) the moving distance of the nozzle may be separately determined for each of the three axes, and furthermore, movement of the winding position setting means side may be additionally and simultaneously performed. In this way, a winding position can be arbitrarily and accurately determined.

(7) By arbitrarily determining the winding position, winding suitable for each shape of various kinds of winding sections can be performed.

(8) Functional capability can be improved according to the above properties.

DESCRIPTION OF THE PREFERRED EMBODIMENTS

Hereinbelow, an embodiment of the winding machine according to the present invention will be explained with reference to the drawings.

Figure 1:
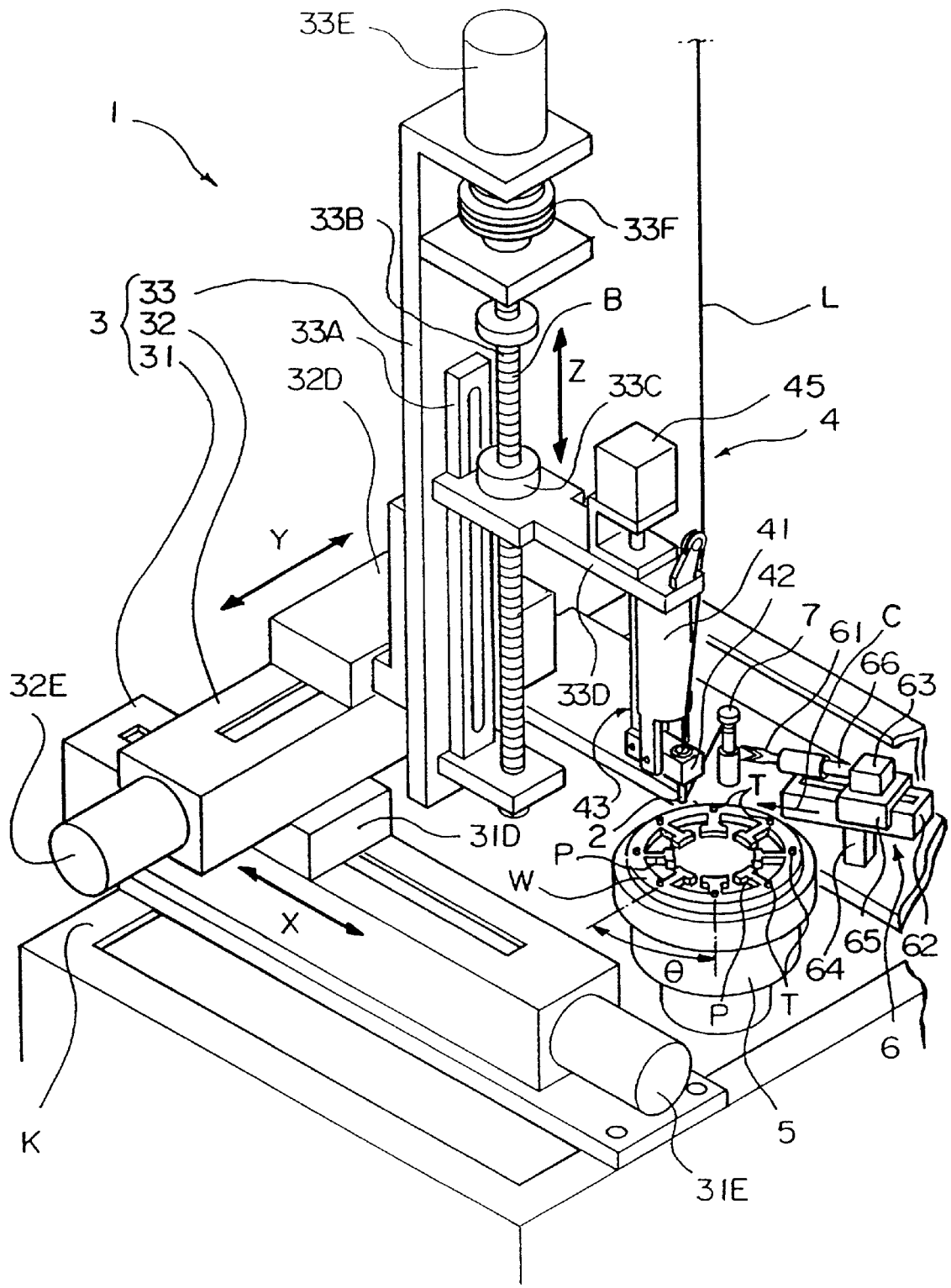
FIG. 1 is a perspective view showing an embodiment of the winding machine according to the present invention.
Figure 2:
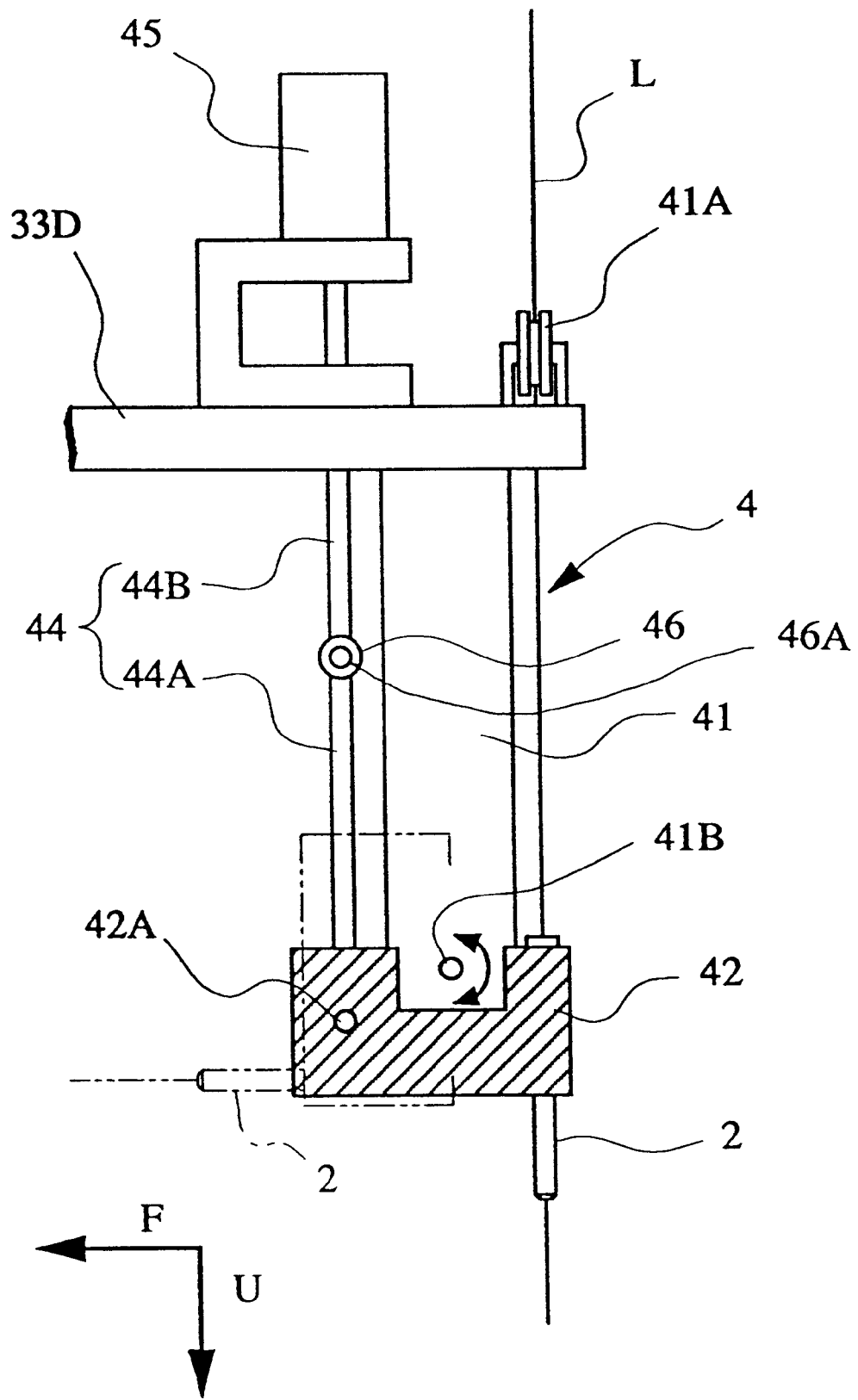
FIG. 2 is an enlarged side view showing switching states of the direction of nozzle 2 in FIG. 1.

In FIGS. 1 and 2, reference symbol W indicates a work (i.e., stator), reference symbols P indicate winding sections (i.e., magnetic poles), reference symbols T indicate wire fixing sections (i.e., terminals), reference symbol L indicates a wire (i.e., lead wire), reference symbol K indicates a base, reference numeral 1 indicates the winding machine, reference numeral 2 indicates a nozzle, reference numeral 3 indicates driving means, reference numeral 4 indicates direction switching means, reference numeral 5 indicates winding position setting means, reference numeral 6 indicates wire cutting means (i.e., a wire cutter), and reference numeral 7 indicates a temporary tie-up pin.

Work W is, for example, a stator of an inner-rotor type motor. This work has plural magnetic poles P projecting into the center, and has terminals T, disposed on its upper surface, to which wire L is connected, as shown in FIG. 1.

Figure 3:
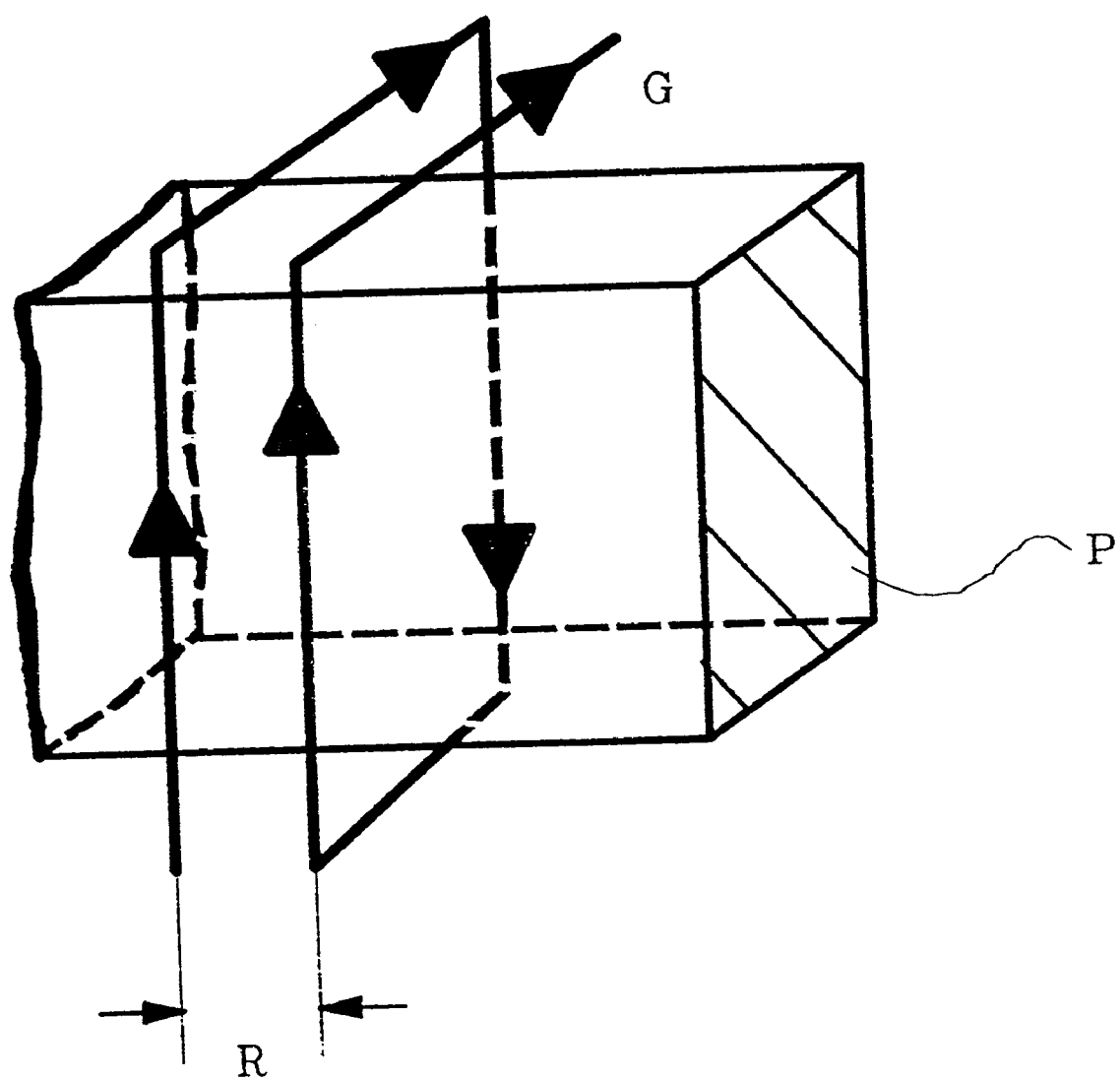
FIG. 3 is a typical perspective view showing the movement of the nozzle along a circumference of a winding section at the winding operation.

The sectional form of each magnet pole P is, for example, a rectangle, as shown in FIG. 3.

On base K of the winding machine 1, nozzle 2 which is movable while pulling out wire L; driving means 3 for driving the nozzle 2; direction switching means 4 for making the direction of nozzle 2 switchable; and winding position setting means 5 for determining a position of winding section P around which the wire L is wound are arranged. Additionally, nozzle 2 is moved in a manner such that it winds the wire W around winding section P, and the wire L is fixed to wire fixing section T when winding is completed.

The driving means 3 consists of three-directional driving sections 31, 32 and 33, that is, cross-direction driving section 31, longitudinal-direction driving section 32, and vertical-direction driving section 33, combined with each other.

These driving sections 31, 32, and 33 have approximately the same driving mechanism along each driving direction X, Y, and Z.

First, vertical-direction driving section 33 will be explained.

The vertical-direction driving section 33 comprises, as shown in FIG. 1, vertical-direction guide 33A arranged along driving direction Z, vertical-direction rotational shaft 33B arranged in parallel with the vertical-direction guide 33A and possessing male screw B on its surface, vertical-direction moving section 33C, combined with the vertical-direction rotational shaft 33B via a ball screw, being movable along vertical-direction guide 33A, vertical-direction connective section 33D connected with vertical-direction moving section 33C, and vertical-direction drive source 33E for rotationally driving vertical-direction rotational shaft 33B.

The vertical-direction rotational shaft 33B is connected with (vertical-direction) drive source 33E via universal joint 33F, as shown in FIG. 1.

The moving range in driving direction Z of the vertical-direction moving section 33C is determined according to the range of male screw B arranged on vertical-direction rotational shaft 33B.

The cross-direction and longitudinal-direction driving sections 31 and 32, having structures similar to vertical-direction driving section 33, are respectively arranged along driving directions X and Y, as shown in FIG. 1.

The cross-direction driving section 31 is fixed on base K and comprises (cross-direction) driving source 31E, as shown in FIG. 1. The longitudinal-direction driving section 32 is disposed such that the section 32 is movable via cross-direction connective section 31D in the cross direction with respect to cross-direction driving section 31.

The longitudinal-direction driving section 32 comprises (longitudinal-direction) driving source 32E, and the vertical-direction driving section 33 is disposed such that the section 33 is movable via longitudinal-direction connective section 32D in the longitudinal direction with respect to longitudinal-direction driving section 32.

In vertical-direction driving section 33, vertical-direction connective section 33D is horizontally projected in front of vertical-direction rotational shaft 33B. Nozzle 2 is provided in vertical-direction driving section 33 via vertical-direction moving section 33C coupled with vertical-direction rotational shaft 33B and via vertical-direction connective section 33D, where nozzle 2 can move in the vertical direction with respect to vertical-direction driving section 33.

Driving sources 31E, 32E, and 33E are, for example, servo motors which can be accurately controlled.

Direction switching means 4 is arranged at vertical-direction connective section 33D, as shown in FIGS. 1 and 2, by which the direction of nozzle 2 can be switched between a vertical direction such as downward direction U and a direction perpendicular to the downward direction U, such as rear direction F.

The Direction switching means 4 comprises, as is also shown in FIGS. 1 and 2, nozzle holder 41 extending downward from the head side of vertical-direction connective section 33D; nozzle rotating section 42 rotatably attached to the nozzle holder 41; and direction setting section 43 for determining the direction of the nozzle rotating section 42.

At the base-end side of nozzle holder 41, guide roller 41A for introducing wire L to nozzle 2 is provided as shown in FIGS. 1 and 2.

The nozzle rotating section 42 is rotatably attached to the lower end of nozzle holder 41 via axis 41 B, and nozzle 2 is provided to nozzle rotating section 42.

The direction setting section 43 comprises crank 44, connected to nozzle rotating section 42, for rotationally driving nozzle rotating section 42 when the section 43 moves in the direction of its length, and crank driver 45 for driving the crank 44 in the vertical direction.

The crank 44 comprises lower crank 44A connected with nozzle rotating section 42 via axis 42A, and upper crank 44B connected with crank driver 45. The lower and upper cranks 44A and 44B are connected with each other via joint 46 for enabling nozzle rotating section 42 to rotate when crank 44 is driven.

As an example of joint 46, a hinge having axis 42A is provided.

A solenoid is used as an example of crank driver 45.

Winding position setting means 5 is disposed on base K, on which stator W is fixed. The setting means 5 is connected with a servo motor or the like, and has an index mechanism for rotating stator W by the pitch of (or distance between) magnetic poles P when winding of each magnetic pole is completed.

Wire cutting means (wire cutter) 6 is disposed at a position on base K, suitable for cutting wire L, and comprises cutter 61 for cutting wire L; moving section 65 to which the cutter 61 is provided; motion rail 62 for defining the (moving) position of the moving section 65; a driving source (not shown), provided inside the motion rail 62, for moving cutter 61 along motion rail 62 by driving moving section 65; cutting operator 63 for making cutter 61 perform a cutting operation during and in cooperation with the driving operation along motion rail 62 by the driving source; and supporter 64, fixed to base K, for supporting the above parts of wire cutter 6 on base K.

Temporary tie-up pin 7 is disposed on base K, near the winding position setting means 5 and wire cutter 6.

Hereinbelow, winding operations of the above-explained winding machine 1 will be explained.

First, as shown in FIG. 1, wire L is pulled out of the head of nozzle 2 via guide roller 41A and through nozzle 2, and the end of the wire is tied up to temporary tie-up pin 7 so as to fix the wire.

Here, nozzle 2 is positioned in downward direction U, as shown by solid lines in FIG. 2, by setting crank 44 in a down position using direction switching means 4.

Next, the wire L pulled out of nozzle 2 arranged in the downward direction U is tied up to terminal T of stator W fixed to winding position setting means 5, by driving the driving means 3 as explained later. Then, wire L between tie-up pin 7 and terminal T is cut using wire cutter 6.

In the wire cutter 6, moving section 65 is moved by the driving source in the direction indicated by arrow C (as shown in FIG. 1) along motion rail 62, by which cutter 61 is shifted so as to make winding of wire L possible. In cooperation with the shifting, cutter 61 performs a cutting operation via cutting operator 63, by which wire L is cut.

After the cutting operation is completed, cutter 61 is again shifted via moving section 65 along motion rail 62, in the direction opposite to the direction indicated by arrow C in FIG. 1, so as to set the position of the cutter where winding by nozzle 2 is possible.

Next, the position of nozzle 2 is switched to rear direction F, as shown by alternate long and two short dashed lines in FIG. 2, by setting crank 44 in the upper position by direction switching means 4, as explained later.

Then, winding is performed by moving nozzle 2 (positioned in rear direction F) around magnet pole P by driving the driving means 3. Here, nozzle 2 is simultaneously driven in three axes using cross-direction, longitudinal-direction, and vertical-direction driving sections 31, 32, and 33.

In vertical-direction driving section 33, vertical-direction rotational shaft 33B is rotationally driven by driving source 33E via universal joint 33F, as shown in FIG. 1. According to the rotation of rotational shaft 33B, vertical-direction moving section 33C coupled with the shaft 33B is moved in driving direction Z along vertical-direction guide 33A, and vertical-direction connective section 33D integrated with the moving section 33C is also moved in driving direction Z.

The vertical-direction moving section 33C is moved within a range specified according to the range of male screw B arranged at vertical-direction rotational shaft 33B.

Similarly, in the cross-direction and longitudinal-direction driving sections 31 and 32, cross-direction connective section 31D is moved in driving direction X and longitudinal-direction connective section 32D is moved in driving direction Y, as shown in FIG. 1.

Therefore, with respect to stator W fixed to winding position setting means 5 on base K, longitudinal-direction driving section 32 is moved in cross direction X by cross-direction driving section 31; vertical-direction driving section 33 is moved in longitudinal direction Y with respect to longitudinal-direction driving section 32; and nozzle 2 is moved in vertical direction Z with respect to vertical-direction driving section 33, as shown in FIG. 1. In this way, nozzle 2 is moved around (circumference of) magnetic pole P of stator W.

Here, nozzle 2 is driven in a manner such that the nozzle is moved around winding section (i.e., magnetic pole) P, that is, along the cross-sectional shape of winding section P as shown in FIG. 3, and also is moved along the direction of the length of winding section P by diameter R of wire L for each round of the winding of wire L. In this way, wire L is wound and drawn up around magnetic pole P.

The sectional form of each magnet pole P is, for example, a rectangle, as shown in FIG. 3, such that the locus of nozzle 2 at the winding passes near magnet pole P as soon as possible, as shown by arrow G in the same figure.

When winding is completed, nozzle 2 is lifted by the driving means, and the direction of the nozzle is switched by direction switching means 4 from rear direction F (at the winding) to a direction substantially perpendicular to direction F, for example, downward direction U as shown in FIG. 2.

In direction switching means 4, as shown in FIGS. 1 and 2, crank 44 is driven in a downward direction by crank driver 45 of direction setting section 43, and lower crank 44A is driven such that the direction of the lower crank is changed with respect to the direction of upper crank 44B via joint 46, by which nozzle rotating section 42, connected to lower crank 44A via axis 42A, rotates around axis 41B as the rotational center. In this way, the direction of nozzle 2 is switched to downward direction U.

The nozzle 2 arranged in downward direction U is driven and moved around terminal T by driving means 3 so as to wind and fix wire L to terminal T.

After wire L is fixed to terminal T, winding position setting means 5 rotates stator W by the pitch (indicated by "θ" in FIG. 1) of magnetic pole P with respect to base K, while nozzle 2 is maintained in the upward direction. Then, the direction of nozzle 2 is switched to rear direction F so as to make the nozzle stand by for winding of next magnetic pole P.

When winding of the last magnetic pole P is completed, wire L is fixed to relevant terminal T in the manner as explained above, and the n nozzle 2 is moved so as to tie up and temporally fix the wire to temporary tie-up pin 7.

After that, wire L between terminal T and pin 7 is cut using wire cutter 6 as explained above, and winding operations for stator W are completed.

Stepping motors can be used as driving sources 31E, 32E, and 33E, and as an example of crank driver 45, an air cylinder may be used.

In addition, joint 46 may be constructed using an elastically deformable member. It is also possible to omit joint 46 and make crank 44 using such an elastically deformable member.

When (lead) wire 6 is wound around magnetic pole P as nozzle 2 is moved, position setting means 5 may be reciprocatively moved in synchronization with the vertical motion of nozzle 2. In this case, magnetic pole P is driven in synchronization with the vertical motion of nozzle 2 as described above; thus, lead (wire) L can be more securely wound onto magnetic pole P.

What is claimed is:

1. A winding machine comprising:
 a nozzle which is movable while letting out a wire;
 driving means for driving the nozzle, the driving means comprising three-directional driving sections that are combined with each other;
 direction switching means for making the direction of the nozzle switchable; and
 winding position setting means for setting the position of a winding section onto which the wire is wound, wherein the wire is wound onto the winding section according to movement of the nozzle, and the wire is fixed to a wire fixing section at the end of winding; and the direction switching means comprises a nozzle rotating section being rotatably arranged, to which the nozzle is fixed and a direction setting section for setting the direction of the nozzle rotating section, and the direction setting section comprises a crank, connected to the nozzle rotating section, for rotationally driving the nozzle rotating section by moving in a direction along the length of the crank; and a crank driver for driving the crank.

2. A winding machine as claimed in claim 1, wherein the crank comprises a joint and at least two parts coupled with the joint, and driving directions of these two parts are different from each other.

3. A winding machine as claimed in claim 1, wherein the crank is elastically deformable.

4. A winding machine comprising:

a nozzle which is movable while letting out a wire;

driving means for driving the nozzle, the driving means comprising three-directional driving sections that are combined with each other;

direction switching means for making the direction of the nozzle switchable; and winding position setting means for setting the position of a winding section onto which the wire is wound, wherein the wire is wound onto the winding section according to movement of the nozzle, and the wire is fixed to a wire fixing section at the end of winding; and the driving means drives the nozzle in a manner such that during winding, the nozzle is moved around the winding section along the cross-sectional shape thereof, and for each round of the winding of wire, the nozzle is moved along the direction of the length of the winding section by the diameter of the wire, and such that the locus of the nozzle at the winding passes near the winding section as soon as possible.

5. A winding machine as claimed in claim 4, wherein:

a plurality of winding sections onto which the wire is wound are arranged on a circumference and spaced at a distance from each other;

the winding position setting means sets the position of each of the plural winding sections in turn so that the nozzle can wind the wire onto the set winding section; and, when winding for each winding section is completed, the winding position setting means rotationally moves the next winding section to be processed so as to set the next winding section to be ready for winding.

6. A winding machine as claimed in claim 5, wherein the winding position setting means sets the winding section to perform a reciprocating motion in synchronization with the motion of the driven nozzle.

7. A winding machine as claimed in claim 4, further comprising wire cutting means including a cutter for cutting the wire; and a temporary tie-up pin to which the wire is tied up for cutting of the wire, and these cutting means and pin being disposed to positions which enable the wire to be cut.

8. A winding machine comprising:

a nozzle which is movable while letting out a wire;

driving means for driving the nozzle, the driving means comprising three-directional driving sections that are combined with each other;

direction switching means for making the direction of the nozzle switchable; and winding position setting means for setting the position of a winding section onto which the wire is wound, wherein the wire is wound onto the winding section according to movement of the nozzle, and the wire is fixed to a wire fixing section at the end of winding; and the driving means drives the nozzle in a manner such that, at the end of winding, the direction of the nozzle is switched to a direction substantially perpendicular to a direction at the winding, and the nozzle is driven to wind and fix the wire to the wire fixing section.

9. A winding machine as claimed in claim 8, wherein the direction of the nozzle is switchable between a vertical direction and a direction perpendicular to the vertical direction by the direction switching means.

* * * * *